United States Patent [19]
Yoshida et al.
[11] 3,895,186
[45] July 15, 1975

[54] APPARATUS FOR RECEIVING ENCODED FACSIMILE SIGNALS WITH MINIMIZED EFFECT OF PULSE JITTER INTRODUCED DURING TRANSMISSION

[75] Inventors: Kunio Yoshida; Hiroyoshi Tsuchiya; Yukifumi Tsuda; Heijiro Hayami, all of Kawasaki, Japan

[73] Assignee: Matsushita Electric Industrial Co., Ltd., Japan

[22] Filed: Jan. 24, 1974

[21] Appl. No.: 436,357

[30] Foreign Application Priority Data

Jan. 25, 1973 Japan .............................. 48-10449

[52] U.S. Cl. ......... 178/69.5 F; 178/69.5 R; 325/65; 325/323
[51] Int. Cl. ........................... H04l 7/00; H04b 1/10
[58] Field of Search .................. 178/69.5 R, 69.5 F; 340/146.1 D; 325/42, 65, 323

[56] References Cited

UNITED STATES PATENTS 3,420,956 1/1969 Heightley et al. ............. 178/69.5 R
3,760,167 9/1973 Schrimshaw ......................... 325/65
3,800,228 3/1974 Acker ............................... 325/323

*Primary Examiner*—Malcolm A. Morrison
*Assistant Examiner*—Errol A. Krass
*Attorney, Agent, or Firm*—Robert E. Burns; Emmanuel J. Lobato; Bruce L. Adams

[57] ABSTRACT

Black and white runs of scanned image signals are encoded into binary information at a transmitting station, transmitted over a transmission link and received by apparatus at a receiving station. Jitter introduced during the transmission is detected by the apparatus prior to the decoding of the received signal to produce an error indicating pulse which is utilized to effect erasure of the image signals of the line scan in which the jitter has occurred to leave the line as a white run. As an alternative, the erased line is filled with the signals on the next line scan to thereby visually improve the quality of reproduced image.

13 Claims, 10 Drawing Figures

PATENTED JUL 15 1975 SHEET 1

3,895,186

PATENTED JUL 15 1975 3,895,186

SHEET 8

APPARATUS FOR RECEIVING ENCODED FACSIMILE SIGNALS WITH MINIMIZED EFFECT OF PULSE JITTER INTRODUCED DURING TRANSMISSION

The present invention relates generally to facsimile communications, and more particularly to the reception of coded facsimile signals for overcoming jitter introduced during transmission to improve the quality of reconstructed images.

In the field of facsimile transmission the general tendency is toward using the technique of encoding the black and white textual or pictorial material into a stream of pulses in coded form to permit the elimination of substantial amounts of signal redundancy prior to transmission. The lengths of successive black and white "runs" along a scanning line are measured and encoded for binary digital transmission according to a predetermined rule dependent upon the statistics of the material being transmitted. At the receiving station, the coded facsimile signals are decoded into the original black and white runs or image signals. However, it is very likely that noise or jitter will be introduced during transmission in the stream of coded pulses which when decoded will be completely disturbed. The signal disturbance occurs at the instant the jitter has occurred and lasts until the end of the scanning line or at the next sync pulse. If jitters occurs at the initial period of a line scan, a substantial amount of the signals on that line will be disturbed and a random sequence of black and white runs is likely to occur. Consequently, the picture quality of the reproduced image is considerably degraded.

Therefore, an object of the present invention is to provide improved apparatus for a receiving station of a facsimile communication system which visually improves the reproduced image by minimizing the effect of jitter.

Another object is to provide improved facsimile receiving apparatus in which a portion of the reproduced image signals on a line scan is erased upon occurrence of jitter.

A further object of the invention is to provide improved facsimile receiving apparatus in which the image signals of the full spatial extent of a line scan in which jitter has occurred are erased.

A still further object of the invention is to provide improved facsimile receiving apparatus wherein image signals in which jitter has occured are erased and those on the next adjacent line scan are reproduced on that line in place of the erased image signals.

In accordance with the present invention, there is provided means for detecting jitter introduced into the transmitted coded facsimile signals. Since jitter is rapid variations in a waveform due to noise or other causes, it can be detected in terms of amplitude, phase and pulse width. In a first preferred form of the invention, the jitter detecting means comprises a plurality of comparators which establish higher and lower bands of threshold levels to produce an error indicating signal when the received signals are outside of the bands. The error indicating signal is utilized to erase the image signals, following the occurrence jitter, of a line scan. A delay gate may be provided to delay the image signals of each line scan for the duration of a line scan so that the signals of the full spatial extent of a line in which jitter has occurred are erased to leave that line as a white run. This arrangement serves to improve quality of the reproduced image compared with one which permits the disturbed signals consisting of randomly arranged black and white runs to be reproduced. For the refinement of the present invention, an inhibit gate is provided to erase one of synchronizing pulses so that the vertical scanning element of the display device is disabled for the duration of a line scan. A second delay gate is provided which serves as a buffer to store the signals of the next adjacent line and responsive to the error indicating signal so that the signals of the adjacent line fill the line in which the corresponding image signals have been erased on account of the jitter as previously described. Because of the statistical correlation of adjacent scanning lines, the repetition of the same image signals does not affect the quality of the reproduced image, it rather improves the image quality. In a second preferred form of the invention, the jitter detecting means comprises means for differentiating the received signals to produce a narrow pulse at the rising and falling edges of the signals and means for producing regularly occurring pulses in synchronism with the received signals and having a predetermined pulse width so that the pulses occurring at each edge of the signal will fall within the duration of the pulse width if the pulse occurs at a displaced position due to jitter.

These and other objects, features and advantages of the present invention will become apparent from the following detailed description when read in conjunction with the accompanying drawings, in which.

Figure 1:
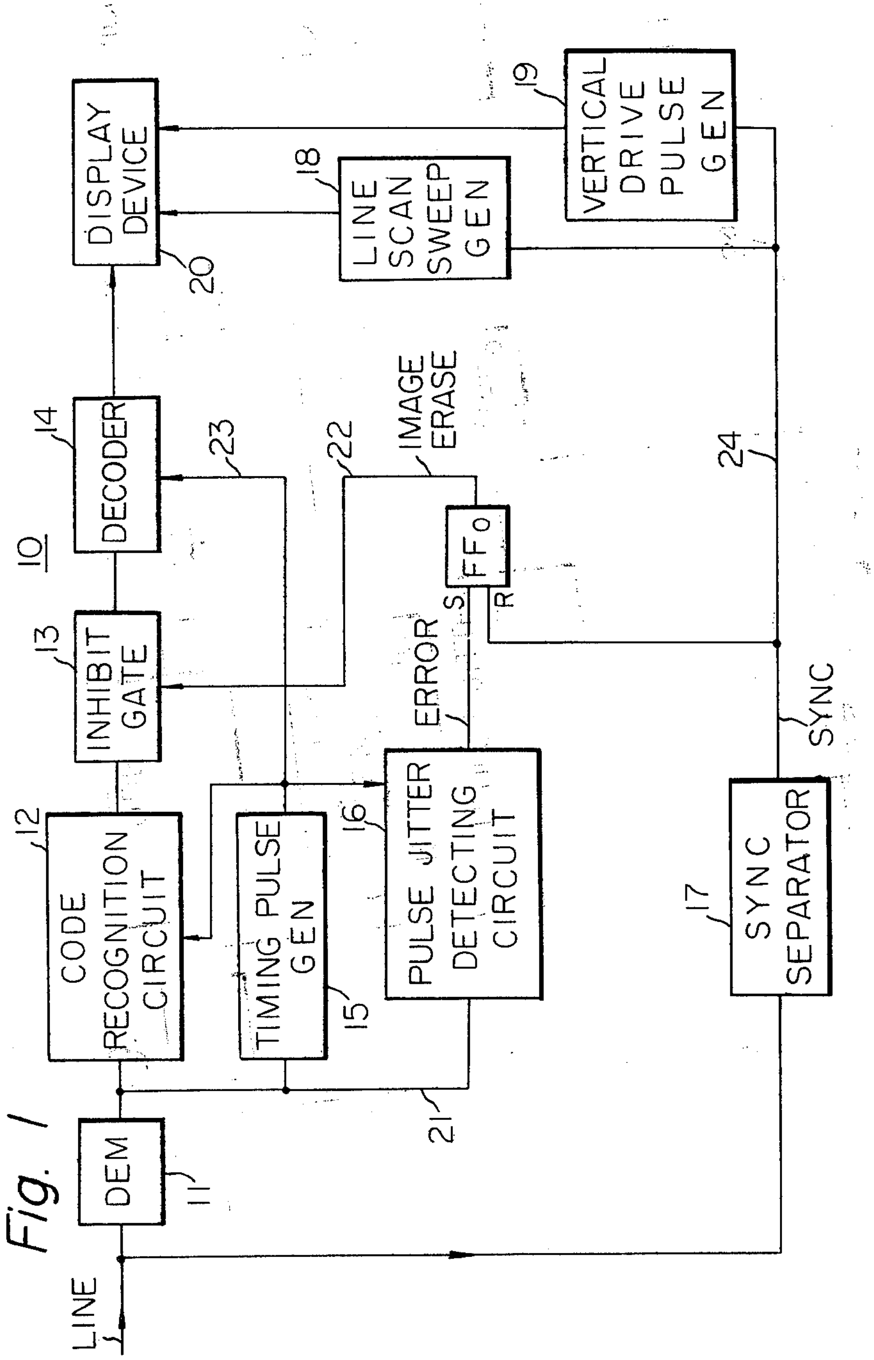
FIG. 1 is a schematic circuit block diagram of a facsimile receiving apparatus in accordance with the invention in which a portion of the image signals of a line is erased upon occurrence of jitter.

Referring now to the drawings wherein like numerals indicate like parts throughout the several views, and in particular to FIG. 1 there is shown a first preferred form of the invention. Image signals comprising line scan signals representative of the light values of a two-valued object field, such as a black and white textual or pictorial material, are encoded at a transmitting station (not shown), interleaved with synchronizing pulses, amplitude modulated and transmitted over a transmission channel. The receiving apparatus 10 of the communication system shown in FIG. 1 generally comprises a demodulator 11 which may be dispensed with if the signal is transmitted over a base band channel, a code recognition circuit 12, an inhibit gate 13, a decoder 14 to recover the original image signals, a timing pulse generator 15 to produce regularly occurring pulses in synchronism with the demodulated signals, a pulse jitter detecting circuit 16, a synchronizing pulse separator or detector 17, a line sweep generator 18, a vertical drive pulse generator 19, and a display device 20. The signals received at the input to the apparatus 10 are applied to the demodulator 11 to recover the encoded signals and fed into the code recognition circuit 12 which is a sequential logic circuit of a well known type which recognizes each code at legitimate timing with the aid of timing pulses which occurs at a regular interval supplied from the timing pulse generator 15 to reconstruct the encoded pulses in a form or to a format suitable for decoding. The demodulated signals are simultaneously supplied on lead 21 to the pulse jitter detecting circuit 16 for detecting jitter contained in the demodulated signals to produce an error indicating pulse which is utilized to set a flip-flop $FF_o$ to the reset terminal of which synchronizing pulses separated at the sync separator 17 are also applied. The flip-flop $FF_0$ is a reset-preference type which is designed to return to the reset condition whenever the reset terminal is energized by the sync pulse. When an error indicating pulse appears setting the flip-flop $FF_o$, an image erase pulse appears on lead 22 and is fed into the inhibit gate 13 to inhibit the flow of visual information. The lead 22 is kept energized until the flip-flop is reset upon the next sync pulse. Therefore, it will be be understood that the image signals, following the occurrence of jitter, on the line scan in which jitter has occurred are erased. The decoder 14 is of a well known type which may comprise a cascaded connection of a shift register, a gate circuit, and a translator. The encoded pulses passed on to the decoder 14 are stored in the shift register, gated upon the timing pulse supplied on lead 23 through the translator where they are translated into the original black or white length corresponding to the code character received. The sync pulses on lead 24 are supplied to the line scan sweep generator 18 as well as the vertical drive pulse generator 19. The sweep generator 18 produces sawtooth wave signals in synchronism with the sync pulses to feed into the display device 20 which may be any of the well known type, for example, a fibre-optics cathode ray tube (not shown) and a known pulse-driven motor which shifts a recording or image developing medium upon the pulses supplied from the vertical drive pulse generator 19. The line scan sweep 18 serves to scan the electron beam of the cathode ray tube in a horizontal direction and the vertical drive pulse generator 19 shifts the recording medium in a direction normal to the horizontal direction by the width of a line scan at the completion of each line scanning. A signal from the decoder 14 representative of the decoded black or white length of run is supplied to the control grid of the cathod ray tube to modulate the intensity of the beam as is well known in the art.

Figure 4:
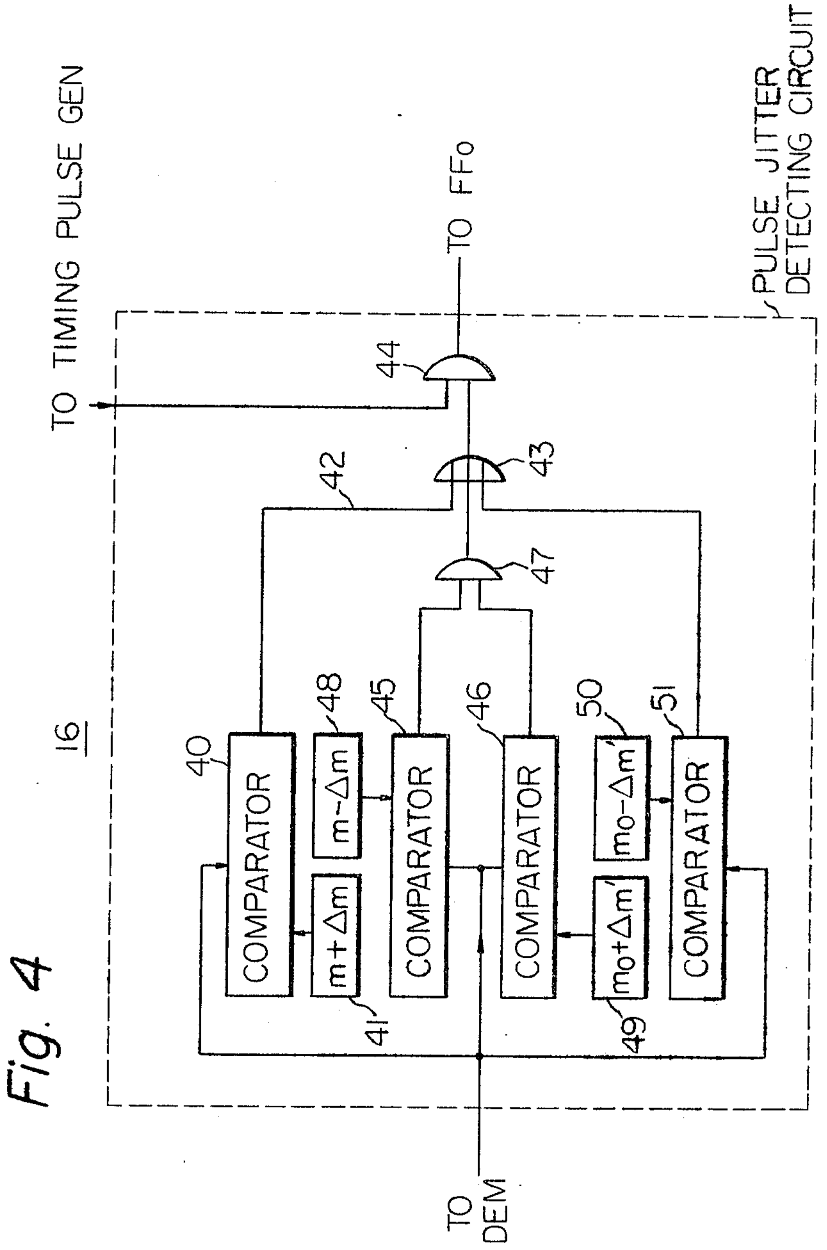
FIG. 4 is a circuit block diagram of a pulse jitter detecting circuit of the facsimile receiving apparatus in accordance with the present invention for detecting jitter in terms of amplitude of the received signals.
Figure 9:
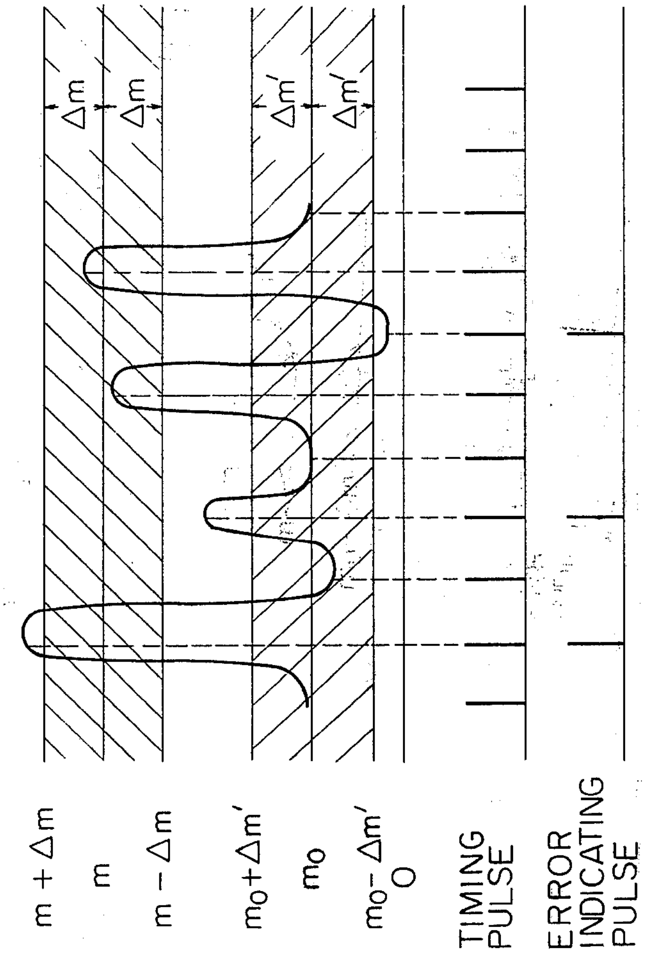
FIG. 9 is a diagram illustrating bands of threshold levels useful for describing the operation of the FIG. 4 circuit arrangement.

The jitter detecting circuit 16 may comprise, as shown in FIG. 4, a comparator 40 which compares the signal input level with a reference threshold level $m + \Delta m$ supplied from a reference voltage supply 41 where m is an intermediate voltage level of a higher band (FIG. 9) and $\Delta m$ represents an allowable range on the upper and lower sides of the intermediate level $m$. Thus, the level $m + \Delta m$ defines the higher threshold level or the maximum expected level of the signal. The demodulated signal is fed into the comparator 40 where the signal level is compared with the reference threshold $m \times \Delta m$ and if the signal exceeds it, an output is delivered on lead 42 and gated by an Or gate 43 and And gate 44 to which the timing pulse is also applied. An error indicating pulse thus appears on the output of the And gate 44 upon coincidence with the timing pulse (FIG. 9). Comparator 45 compares the input signal level with a reference threshold level of $m - \Delta m$ provided by the reference voltage supply 48 which defines the lower threshold level of the higher band and comparator 46 serves to compare with a reference threshold level of $m_o + \Delta m'$ supplied from a reference voltage supply 49 where $m_o$ represents an intermediate voltage level of a lower band and $\Delta m'$ represents an allowable range on the upper and lower sides of the intermediate level $m_o$. If the demodulated signal lies between these two levels, an And gate 47 will be energized to produce an output through Or gate 43 to the And gate 44 and an error indicating pulse will be delivered upon coincidence with the timing pulse. Similarly, comparator 51 compares the input signal level with a reference threshold level $m_0 - \Delta m'$ supplied from the reference voltage supply 50 which defines the lower limit, or the minimum expected level of the demodulated signal. If the input signal is below the minimum expected level the comparator 51 produces an output to the OR gate 43. Therefore, if the input image signal amplitude lies outside of the higher and lower bands of allowable range, an error signal will be delivered indicating that jitter has occurred.

Figure 5:
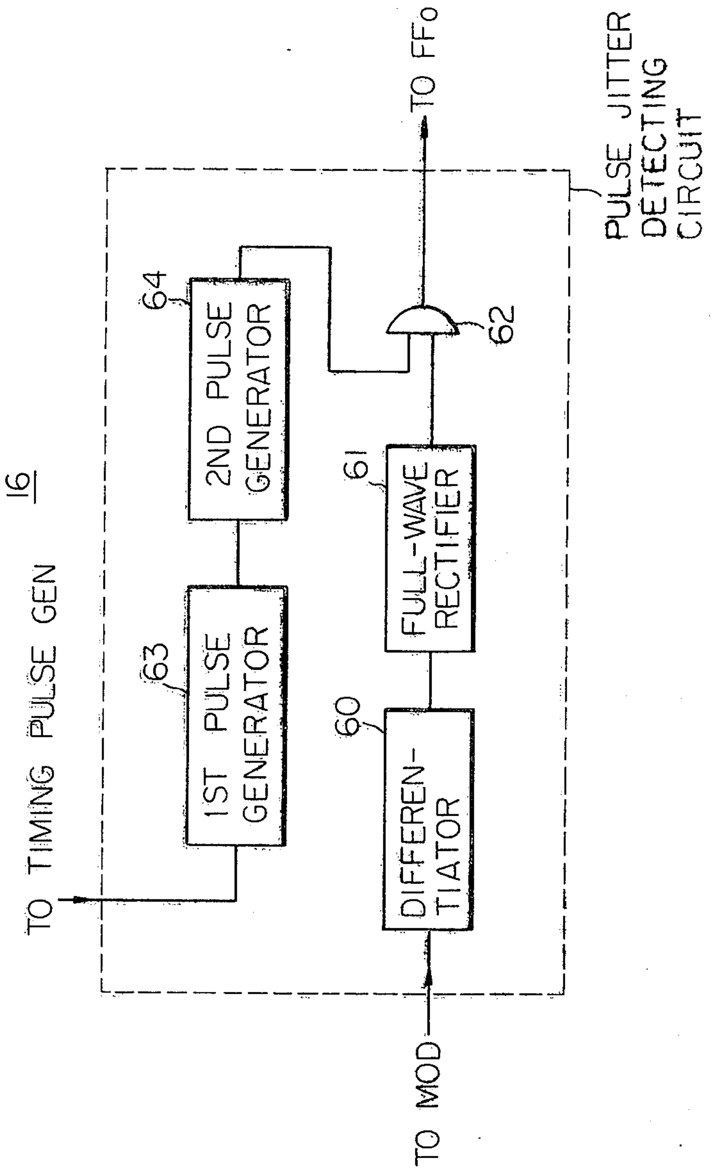
FIG. 5 is a circuit block diagram of another pulse jitter detecting circuit of the invention for detecting jitter in terms of phase or pulse width of the received signals.
Figure 10:
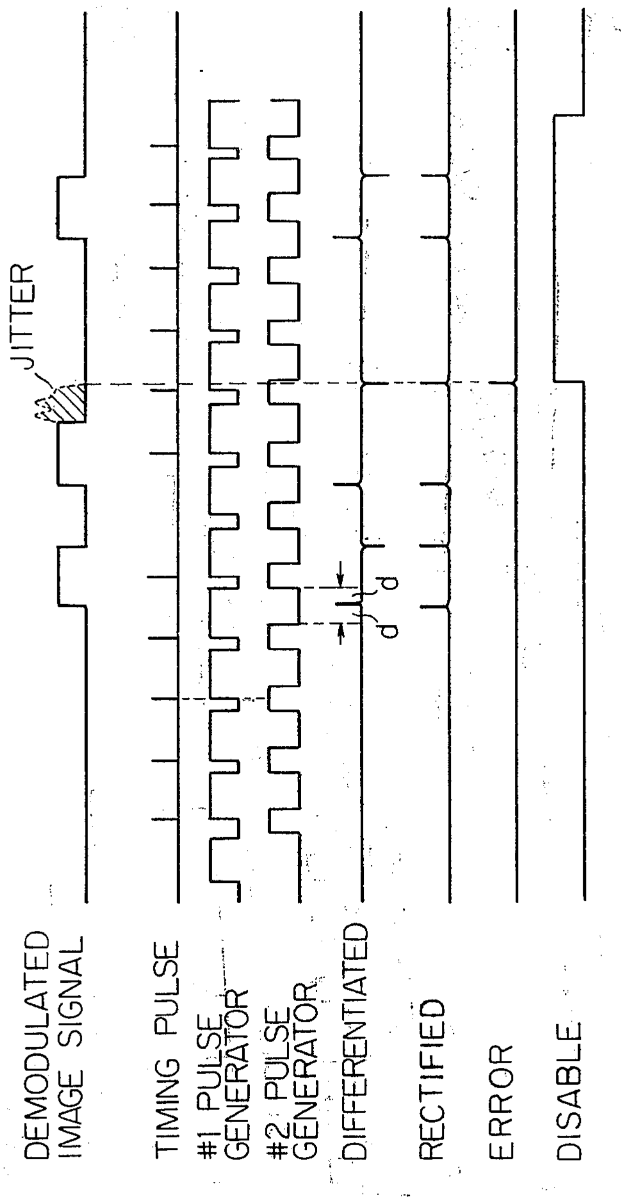
FIG. 10 is a diagram illustrating various waveforms useful for describing the operation of the FIG. 5 circuit arrangement.

Another form of jitter detecting circuit is shown in FIG. 5. Signal from the demodulator 11 is applied to a differentiator 60 where opposite-going sharp pulses are produced each occurring at the rising and falling edges of the applied signal (FIG. 10). The differentiated pulses are passed on to a full-wave rectifier 61 where the pulses are rectified to develop positive-going pulses which are fed into an And gate 62. The timing pulses generated at the timing pulse generator 63 are applied to the input to a first pulse generator 63 which produces first square pulses is synchronism with the applied pulses. The first square pulses are applied to a second pulse generator 64 where the applied pulses are modified in terms of pulse width such that the falling edge of a given pulse and the rising edge of the immediate following pulse are equally spaced apart ($d$ in FIG. 10) from the differentiated pulse. If jitter occurs in such a way as to distort the waveform of the demodulated image signal so that the pulse width is varied as shown in FIG. 10, the differentiated pulse falls within the duration of the second square pulse. The And gate 62 serves as a coincidence circuit to provide an output indicating that jitter has occurred when such coincidence occurs between the differentiated pulse and the second square pulse.

Figure 2:
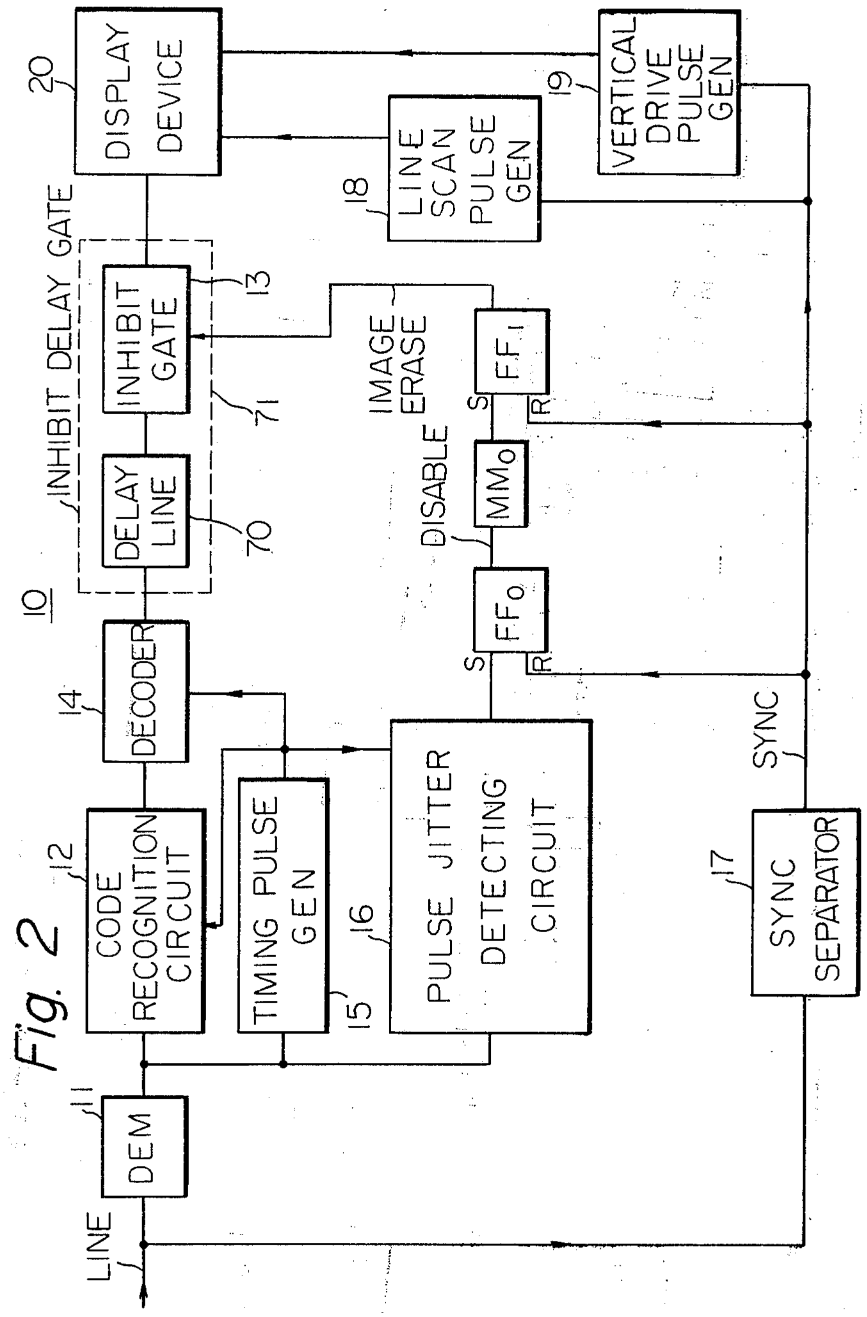
FIG. 2 is a schematic circuit block diagram of a facsimile receiving apparatus in accordance with the invention in which the image signals of the full spatial extent of a line in which jitter has occurred are erased to leave that line as a white run.
Figure 7:
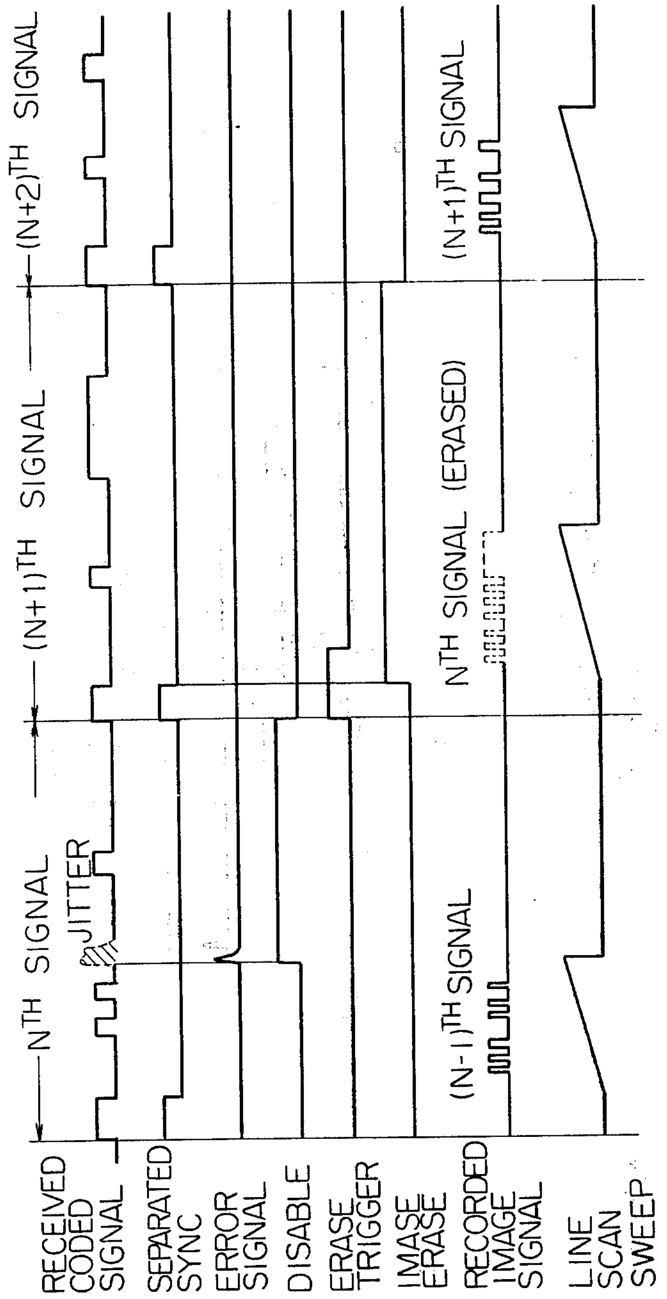
FIG. 7 illustrates various waveforms appearing on the circuit of FIG. 2.

According to a second preferred embodiment of the invention, shown in FIG. 2 the apparatus is provided with a delay line memory 70 interposed between the decoder 14 and inhibit gate 13 for delaying the decoded image signal substantially for the duration of a line scan. A monostable multivibrator $NM_o$ and flip-flop $FF_1$ in cascaded connection are interposed between the flip-flop $FF_o$ and the inhibit gate 13. When jitter is detected in the jitter detecting circuit 16, an error indicating signal is produced to cause the flip-flop $FF_o$ to change to a set condition and upon the next sync pulse it returns to a reset condition, thus producing a pulse (disable). The disable pulse causes the multivibrator $MM_o$ to produce an erase trigger pulse having a pulse width longer than that of sync pulse (FIG. 7). The erase trigger pulse is applied to the set terminal of the flip-flop $FF_1$ and the sync pulse to the reset terminal thereof. At the falling edge of the sync pulse, the flip-flop $FF_1$ produces an image erase pulse to energize the inhibit gate 13 so that the delayed image signals on the line scan wherein the jitter has occurred will be erased. Upon the subsequent sync pulse, the flip-flop $FF_1$ is reset, causing the inhibit gate 13 to open its gate for passage of subsequent image signals. As shown in FIG. 7, jitter occurred in the signal on the Nth line and the corresponding decoded signal is erased on the next line scan period due to the delay provided by the delay line memory 70 which constitutes together with the inhibit gate 13 an inhibit delay gate 71. Therefore, the image signals of the full spatial extent of the line scan in which jitter has occurred are erased to leave that line as a white run. It was shown that erasure of image signals on an entire line gives a pleasing appearance as compared with one having disturbed signals appearing on the jitter affected line.

Figure 3:
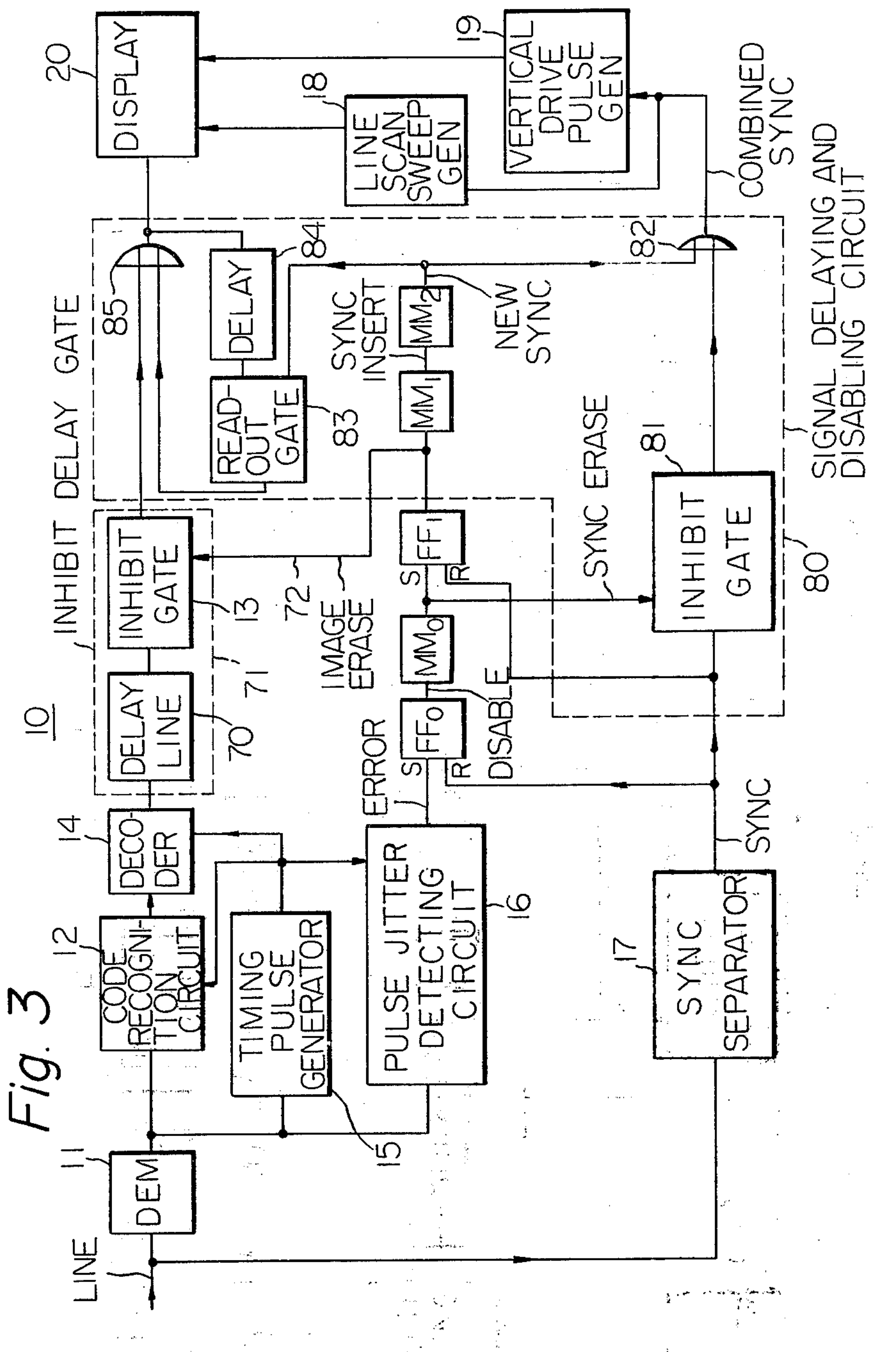
FIG. 3 is a schematic circuit block diagram of a facsimile receiving apparatus in accordance with the invention in which the erased line is filled with the signals of the next adjacent line.
Figure 8:
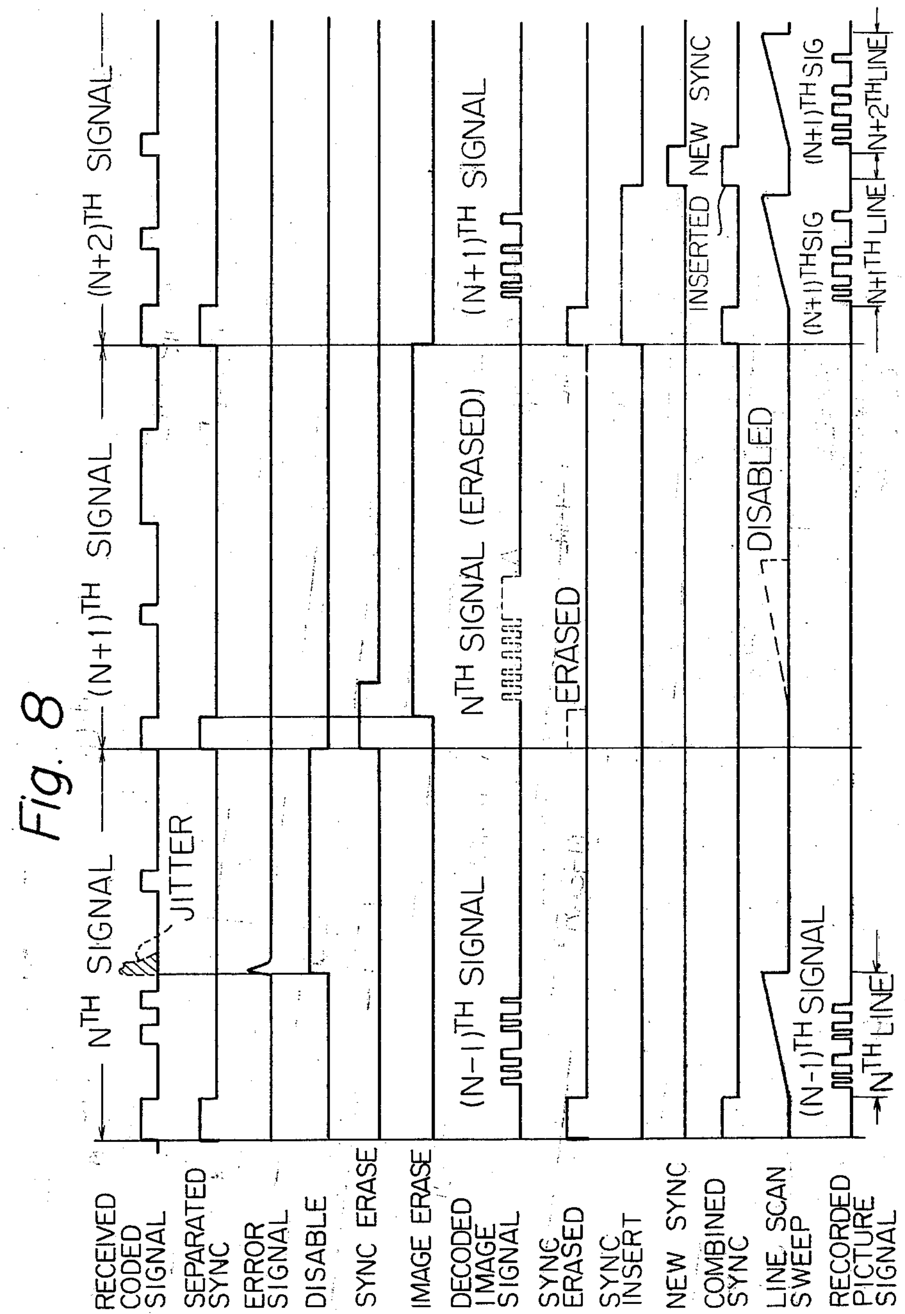
FIG. 8 illustrates various wave forms appearing on the circuit of FIG. 3.

For the refinement of the present invention, a signal delaying and disabling circuit 80 is provided as shown in dashed lines in FIG. 3 in order to fill the erased line with the image signal of the adjacent line. Upon occurrence of an error indicating pulse, the flip-flop $FF_o$ provides a disabling pulse which is applied to the multivibrator $MM_o$ which in turn produces a sync erase pulse having a pulse width longer than that of the sync pulse. The sync erase pulse is applied to an inhibit gate 81 which is provided at the output of the sync separator 17 so that, assuming the jitter has occurred on signals on the Nth scanning line, the sync pulse of the (N + 1)th line will be inhibited. Th sync erase pulse is also applied to the set terminal of the flip-flop $FF_1$. At the falling edge of the sync pulse of the (N + 1)th line scan, the flip-flop $FF_1$ applies an image erase pulse on lead 72 to the inhibit gate 13 of the inhibit delay gate 71. The image erase pulse is also applied to a monostable multivibrator $MM_1$ which produces produces a sync insert pulse having a pulse width substantially equal to the duration of a line scan so as to insert a new sync pulse, which will be produced at a monostable multivibrator $MM_2$, into the stream of sync pulses after the sync pulse of the (N + 2)th line scan (FIG. 8). The multivibrator $MM_2$ produces the new sync at the falling edge of the sync insert pulse. The new sync pulse is applied to an Or gate 82 to which subsequent sync pulses are also applied. It is clear from the foregoing that the image signals on the Nth line scan are erased and the sync pulse of the (N + 1)th line scan is also erased, and therefore, the line where jitter has occurred is left as a white run while the vertical drive pulse generator 19 is disabled by the inhibition of the sync. On the other hand, the new sync is applied to a read-out gate 83 to which a delay line memory 84 is connected. The delay line memory 84 has its input connected to the output of the inhibit gate 13 through an Or gate 85 and constitutes together with the read-out gate 83 a feedback loop with its output coupled to the Or gate 85. The delay line memory 84 functions to further delay the image signals substantially for the duration of a line scan so that the signal on the (N + 1)th line scan is delayed substantially for the duration of two scanning lines and gated by the read-out gate 83 upon application of the new sync pulse in order to fill the (N + 2)th line on the recording medium, while the image signal of the (N + 1)th line delayed for the duration of one scanning line is applied to the display device 20 and recorded on the (N + 1)th line upon the sync pulse of the (N + 2)th line prior to the insertion of the new sync as shown in FIG. 8. At the completion of image scan along the (N + 2)th line, the read-out gate 83 remains disabled thereafter so that the system resumes normal scanning operation.

Figure 6:
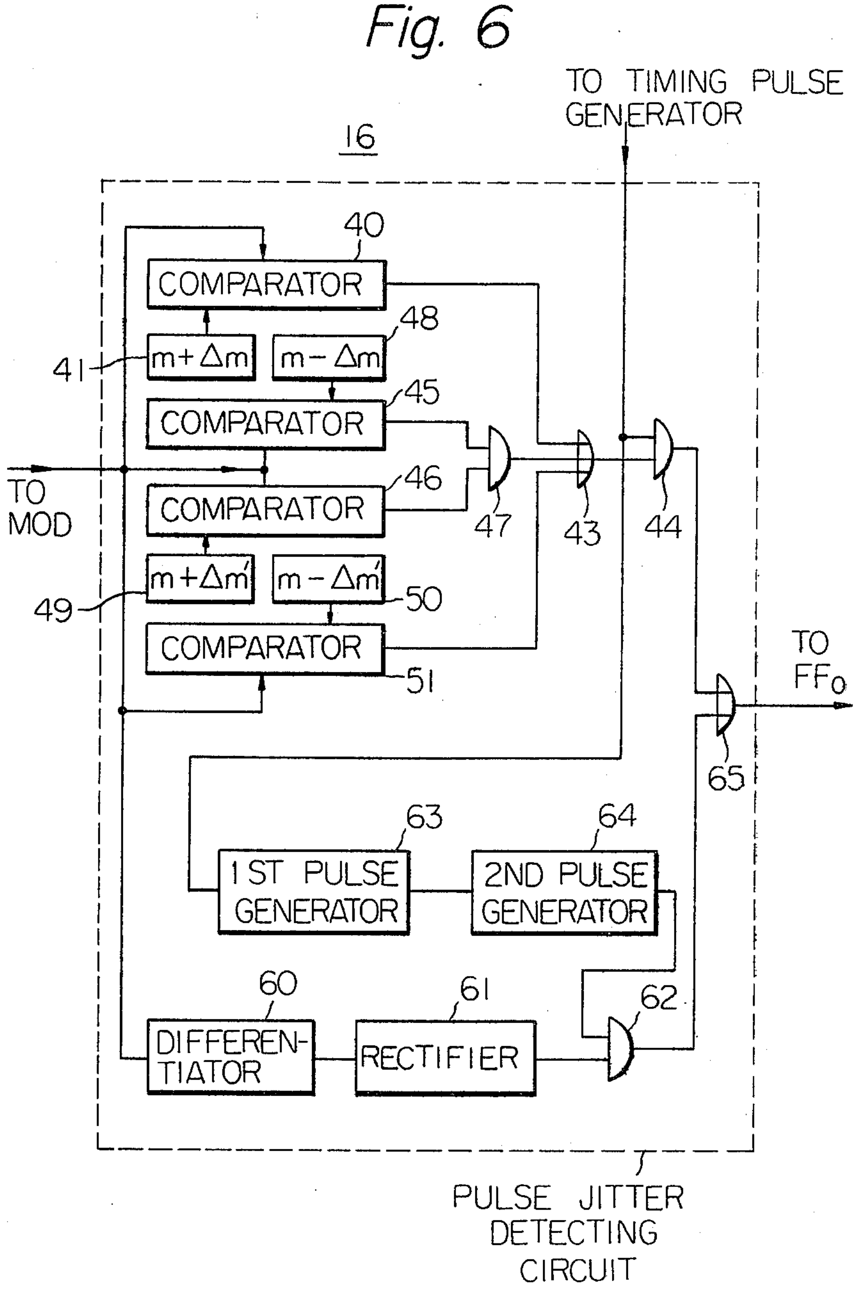
FIG. 6 is a circuit block diagram of still another pulse jitter detecting circuit in accordance with the invention for detecting jitter in terms of amplitude, phase and pulse width of the received signals.

In FIG. 6, there is shown a combination of the jitter detecting circuits of FIGS. 4 and 5. This combined arrangement detects jitter distorting the signal waveform in amplitude, phase and pulse width. The circuits of FIGS. 4 and 5 are parallel connected both at the input and output thereof with an Or gate 65 coupled to the combined output for passage of the error indicating pulse to the flip-flop $FF_o$.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. Apparatus for a facsimile communication system receiving station receptive in operation of digital image signals comprising a sequence of synchronization signals and line scan signals synchronized with said synchronization signals, each line scan signal comprising pulses jointly representative of the brightness of an image along one dimension thereof at a given point along another dimension of said image, wherein said apparatus comprises:

means receptive of said digital image signals for detecting pulse jitter of said pulses comprising said line scan signals;

means receptive of said digital image signals for detecting said synchronization signals; and means having an output, and receptive of said digital image signals and cooperative with said pulse jitter detecting and synchronization signal detecting means for gating said image signals to said output in the absence of pulse jitter and for inhibiting all the remaining pulses in a given line scan signal from appearing at said output upon detection of pulse jitter in said given line scan signal.

2. An apparatus according to claim 1 further comprising, a code recognition circuit receptive of said digital image signals for changing the format of said pulses comprising said line scan signals to a format suitable for decoding and means for applying said pulses in the changed format to said means for gating said image signals.

3. An apparatus according to claim 1 further comprising, means receptive of the gating means output pulses for decoding the gating means output pulses to develop signals having amplitude variations corresponding to the brightness variations of the image represented by said line scan signals.

4. An apparatus according to claim 3 further comprising, display means receptive of said decoder means output signals and synchronization signal detection means output signals for displaying visual signals each having brightness variations along a first direction corresponding to the amplitude variations of one of said decoder output signals.

5. An apparatus according to claim 1 further comprising, delay means receptive of said digital image signals for delaying said digital image signals for a period of time equal to the duration of one line scan signal, and means for applying said delayed image signals to said gating means whereby the entire line scan signal including a pulse having pulse jitter is inhibited from appearing at said output.

6. An apparatus according to claim 5 further comprising, second gating means having an output and receptive of the output signals of said first gating means and cooprative with said pulse jitter detector and said synchronization signal detector for applying said output signals to said second gating means output, said second gating means having means for storing successive line scan signals and for applying the previously stored line scan signal to said second gating means input when one of said line scan signals is inhibited by said first gating means.

7. An apparatus according to claim 3 wherein said second gating means comprises, and Or gate receptive of the output of said first gating means, a read-out gate having an output connected to an input of said Or gate, a delay circuit for applying the output of said Or gate to an input of said read-out gate after a delay equal to the duration of one line scan signal, and means cooperative with said pulse jitter detector and said synchronization signal detector for enabling said read-out gate to apply the output of said delay circuit to an input of said Or gate when said first gating means is inhibited.

8. An apparatus according to claim 7 wherein said means for enabling said read-out gate comprises, a flip-flop having a first input connected to the output of said pulse jitter detector and a second input connected to the output of said synchronization signal detector, a monostable multivibrator receptive of the output of said flip-flop, and means for applying the output of said monostable multivibrator to enable said read-out gate.

9. An apparatus according to claim 8 wherein said means for applying the output of said monostable multivibrator comprises a second flip-flop and a second monostable multivibrator in cascade.

10. Apparatus as claimed in claim 1 further comprising, means for generating timing pulses in synchronism with the pulses comprising said line scan signals, and wherein said pulse jitter detecting means includes a plurality of comparing means receptive of said timing pulses and said pulses comprising said line scan signals for producing an error signal when the pulses comprising said line scan signals are outside of predetermined ranges of amplitude level.

11. Apparatus as claimed in claim 10, wherein said jitter detecting means includes a first comparator having a first predetermined reference level for producing a first error signal when said pulses comprising said line scan signals exceed said first reference level, a second comparator having a second reference level for producing a second error signal when said pulses comprising said line scan signals are below said second reference level, a third comparator having a third reference level for producing a third error signal when said pulses comprising said line scan signals exceed said third reference level, a fourth comparator having a fourth reference level for producing a fourth error signal when said pulse comprising said line scan signals are below said fourth reference level, a first And gate coupled to said second and third comparators to receive said second and third error signals respectively, an Or gate coupled to said first and fourth comparators and said first And gate to receive said first and fourth errors signals, respectively, and the output of said first And gate, and a second And gate coupled to said Or gate to receive the output thereof and receptive of said timing pulses.

12. Apparatus as claimed in claim 1, wherein said pulse jitter detecting means includes means for differentiating said pulses comprising said line scan signals, a full-wave rectifier coupled to said differentiating means, means receptive of said pulses comprising said line scan signals for generating regularly occurring pulses having a predetermined pulse width, and an And gate coupled to said full-wave rectifier and said pulse generating means for receiving the outputs thereof.

13. Apparatus as claimed in claim 1 further comprising, means for generating timing pulses in synchronism with the pulses comprising said line scan signals, and wherein said pulse jitter detecting means includes a plurality of comparing means receptive of said timing pulses producing an error signal when said pulses comprising said line scan signals exceed predetermined levels of amplitude, means for differentiating said digital image signals, a full-wave rectifier coupled to said differentiating means, means receptive of said timing pulses for generating second regularly occurring pulses having a predetermined pulse width, and an And gate coupled to said full-wave rectifier and to said pulse generating means for receiving the outputs thereof.

* * * * *